June 25, 1929.	B. SHAFFER	1,718,260
ELECTRICAL COOKING APPLIANCE
Filed Jan. 11, 1928
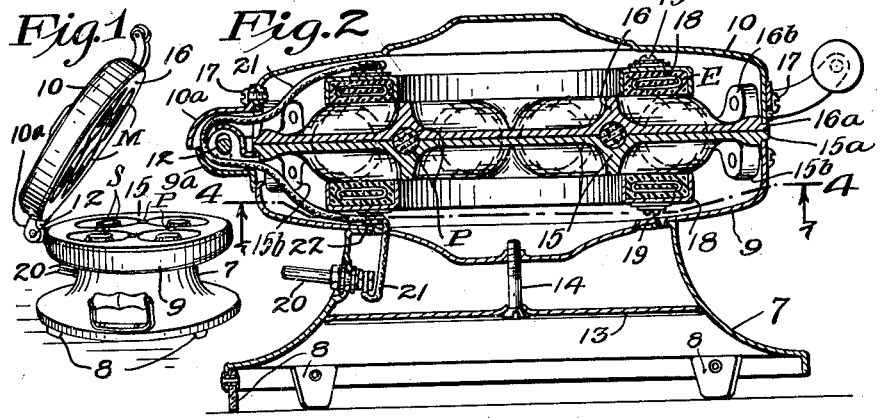
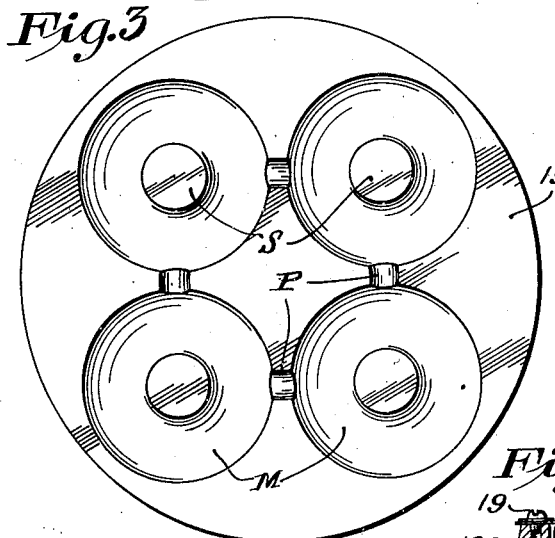
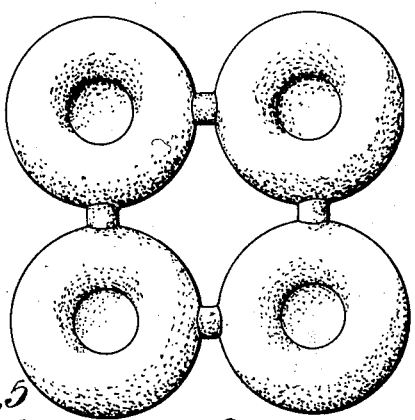
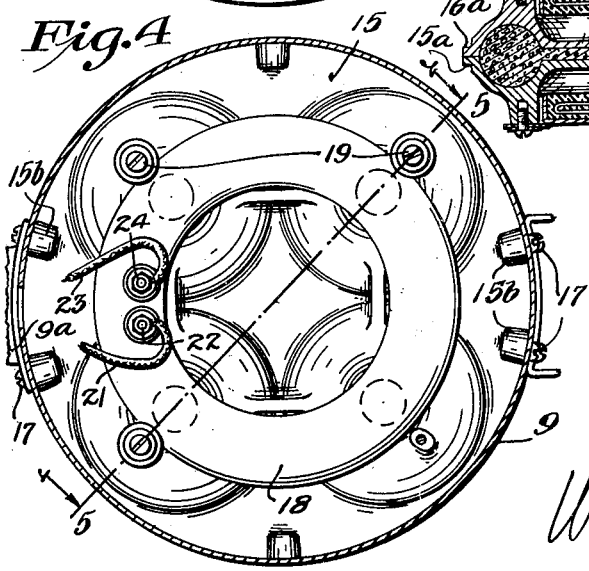
Inventor
Benjamin Shaffer
By his Attorneys
Williamson Reif Williamson Patented June 25, 1929.

1,718,260

UNITED STATES PATENT OFFICE.

BENJAMIN SHAFFER, OF MINNEAPOLIS, MINNESOTA, ASSIGNOR TO DOMINION ELECTRICAL MFG. COMPANY, OF MINNEAPOLIS, MINNESOTA.

ELECTRICAL COOKING APPLIANCE.

Application filed January 11, 1928. Serial No. 245,907.

This invention relates to electrical cooking appliances for baking a plurality of small cakes or the like from self-rising dough and more particularly relates to a device comprising a pair of hinged sections co-operating to form a mold to produce a plurality of baked articles.

In such devices the batter or dough which is previously mixed is usually poured in the mold cavities of one of the hinged sections and the other section is then swung into registration therewith to shape the dough or batter as it rises under a proper cooking temperature. It is usually exceedingly difficult to gauge the exact amount of batter to fill each mold cavity properly and as a rule an excess is poured in one or more of the cavities. Usually as the batter or dough expands in the course of cooking it tends to overflow from between the sections of the device sometimes running down the side of the lower section and often forcing the sections apart and thus causing a serious loss in the heating efficiency of the iron and preventing an even distribution of heat.

It is an object of my invention to provide a comparatively simple appliance for efficiently baking in one operation a plurality of dough articles wherein an excess of dough or batter in any of the mold cavities may be distributed to other cavities of the mold having less batter therein or may be taken care of without causing an overflow between the sections of the iron and without causing the sections to spread apart due to the rise of the batter.

A further object is to provide a comparatively simple appliance for efficiently baking doughnuts and crullers without the use of deep fat or grease.

Another object is to provide an electrical cooking appliance of the class described wherein articles of dough may be uniformly cooked throughout and which may be easily assembled and manufactured at comparatively low cost.

Another object is to provide an electric doughnut baker adapted to bake and form a plurality of doughnuts at one operation said doughnuts being interconnected to form integral relatively large cakes, capable of being removed from the mold and subsequently separated.

These and other objects and advantages of the invention will be apparent from the following description made in connection with the accompanying drawings in which like reference characters refer to similar parts throughout the several views, and in which, Fig. 1 is a perspective view of an embodiment of my invention for cooking doughnut shaped cakes, the upper section of the device being shown in partially raised position;

Fig. 2 is a vertical section of the embodiment of my invention illustrated in Fig. 1, said section being taken on a line which does not intersect the main portions of the molds;

Fig. 3 is a plan view of one of the mold sections or grids detached;

Fig. 4 is a cross section taken on the line 4—4 of Fig. 2, showing the outer portion of the lower mold with the heating unit applied thereto in plan;

Fig. 5 is a vertical section of the complementary grids in position for baking, said section being taken on the line 5—5 of Fig. 3; and Fig. 6 is a plan view of the product made from my doughnut baker.

In the drawings, an upwardly tapered hollow base 7 of considerable area is illustrated supported on a plurality of circumferentially spaced legs 8 of non heat-conducting material. A pair of dish-shaped casings 9 and 10 which may be of identical construction are supported concentrically from base 7, said sections being hinged together in any suitable manner. As shown, casings 9 and 10 are provided with inter-fitting hinge shells 9ª and 10ª respectively having their adjacent sides open and having their ends pivotally connected together by any suitable means such as pins or rivets 12, said hinge structure affording a housing for the passage of the service wires from one section of the device to the other. The lower casing 9 may be secured to the base in any suitable manner, but I prefer to provide a disc 13 fitting concentrically within base 7 and seated in the tapered portion thereof. Said disc and lower casing 9 may be secured together by a single centrally disposed draw bolt 14, bolt 14 threadedly engaging a suitable boss on casing 9. It will be seen that disc 13 and casing 9 are spaced apart leaving an enclosed air space between the bottom of the base and the upper portion of the device. Lower and upper grids 15 and 16 respectively are secured within the open outer ends of casings 9 and 10 respectively, said grids as shown being identical in structure and having relatively narrow outwardly projecting annular flanges 15ª and 16ª adapted to abut the edges of casings 9 and 10. Grids 15 and 16 are further provided with circumferentially spaced lugs 15ᵇ and 16ᵇ adjacent their peripheries by which they may be secured to casings 9 and 10, any suitable retaining means, such as the screws 17 being utilized. Grids 15 and 16 have flat registering surfaces and are each provided with a plurality of annular trough like recessed molds M, as shown said molds on each grid being four in number and having their centers coincident with the four corners of a square.

Each of the molds M is provided with a concentric stud S defining the annular trough and terminating short of the flat face or registering surface of the grid, as shown in Fig. 5. The grids are so secured to their casings 9 and 10 that the molds M in the respective grids will be oppositely alined when the device is closed for baking, as shown in Figs. 2 and 5. The mold recesses M in each grid are interconnected by means of a plurality of relatively short passages P, said passages, as shown, being of semi-circular cross section and the corresponding passages of the two grids registering when the device is closed for baking, as clearly shown in Fig. 2.

Heating elements E of any suitable type may be employed said heating elements being preferably arranged in circular form and disposed within annular trough shaped shells 18. The heating elements E are preferably embedded in some plastic, self-hardening material, such as clay or cement with which the shells 18 are filled and said shells are secured to the outer sides of grids 15 and 16 by means of washer equipped bolts 19 the washers 19ª overlapping the outer peripheries of said troughs. Bolts 19 have threaded engagement at their inner ends with suitable lugs or portions of grids 15 and 16 whereby shells 18 containing the heater elements may be clamped tightly against the outer sides of the grids, as shown in Fig. 4. Annular shells 18 are of such diameter as to cover the centers of the several molds M. I provide a pair of electrical terminals 20 insulated from and secured to base 7 in any suitable manner, said terminals preferably being in the form of posts projecting from the exterior of said base and having their inner ends disposed within the enclosed space between lower casing 9 and disc 13. The electrical current may pass through one of the service wires 21 through terminal 22 connected with the lower heating element and upwardly to the upper heating element, service wire 21 preferably passing through the shell hinged members 9ª and 10ª and being hidden thereby, the circuit being returned to the other terminal post 20 by means of a second service wire 23, said service wire also being connected to the opposite terminal 24 of the lower heating elements. Posts 20 may be electrically connected with a conventional plug connected to a household source of electricity.

*Operation.*

The operation of my improved doughnut baking appliance may be briefly described as follows:—

Suitable batter of the nature used for making doughnuts is prepared and this batter preferably includes a substantial amount of shortening. The molds M of the lower grid are substantially filled with the batter and a source of electricity is connected with the terminal posts 20. The upper grid 15 is swung to substantially horizontal position in registration with lower grid 16, the complementary mold cavities M, studs S and compensating passages of the two grids being alined. The batter, of course, rises substantially during the baking, filling the spaces in the upper mold section and also the spaces between the oppositely disposed studs S. If any of the lower molds M have been filled in excess with batter or if the rise of the batter is more than sufficient to just fill the upper molds M the excess will be taken care of by the communicating passages P between the molds and by the space between the oppositely disposed studs. There will, therefore, be no lifting of the upper grid due to the rising of the batter but the doughnuts will be perfectly baked and the grids 15 and 16 will be disposed in registration throughout the cooking period. When the baking has continued for the desired time the upper grid is lifted by means of a convenient handle and the product may be removed. When the lower molds are filled with batter material the rise of batter is almost always sufficient to cause the passages P to be filled connecting the four doughnuts formed, as shown in Fig. 6, and permitting the same to be conveniently handled as a unit. The connecting portions of the doughnut may be easily broken when the product is removed to separate the individual doughnuts.

It will be apparent that the construction and application of the heating units to the upper and lower grids causes efficient and uniform distribution of heat throughout the molds, since the annular shells 18 are disposed concentrically of the grids overlying and underlying as the case may be the centers of the several mold cavities M and the studs S. Studs S, therefore, radiate heat centrally of the several doughnuts formed and the shells 18 reflect a large portion of the heat from the heating elements against the grids.

My baking appliance is especially adaptable for manufacture at low cost and may be quickly and easily assembled. In the first place, the upper and lower sections of the device, including the casings 9 and 10, the grids 15 and 16, heating element and the shells 18 are identical for each section, with the exception that the casing 9 for the lower section is centrally punched and threaded to receive the draw bolt 14. It will be obvious that it is exceedingly simple to secure the lugs 15b and 16b of the respective grids to the casings and that the heating units may be easily and quickly attached by means of the washer-provided bolts 19, the bolts further serving to draw the shells 18 tightly against the outer surface of the grid. Base 7 is attached by merely placing the lower casing 9 within the upper end of said base and applying draw bolt 14. The enclosed space within the base between the lower casing 9 and disc 13 effectively prevents the lower portion of the base from becoming heated or from scorching the table or supporting surface.

From the foregoing description it will be seen that I have invented a simple but highly efficient appliance for baking cakes and doughnuts adapted for commercial manufacture and operative to produce excellent results.

It will, of course, be understood that various changes may be made in the form, details, arrangement and proportions of the parts without departing from the scope of the invention.

What is claimed is:

1. In a cooking appliance, upper and lower mold sections, said sections each having a plurality of individual mold cavities, said cavities being spaced a relatively short distance apart with their centers substantially coincident with the corners of a polygon, the cavities of one section being oppositely disposed to those of another section when the sections are placed together, a plurality of relatively short grooves, each interconnecting a pair of said cavities at their points of closest proximity, the grooves of one section registering with the corresponding grooves of the other section when said sections are placed together to afford passages interconnecting the upper portions of the molds adapted to accommodate excess batter during cooking and to compensate for deficiencies of batter in one or more molds.

2. In a cooking appliance, a pair of co-operating mold sections, said sections being oppositely disposed in pairs when said sections are placed together, a centrally disposed stud in each of said cavities, said studs terminating short of the registering faces of the mold sections, whereby space will be left between the several pairs of oppositely disposed studs to accommodate excess batter during cooking.

3. In an electrical cooking appliance, a pair of co-operating mold sections having mold cavities adapted to be oppositely disposed when said sections are placed together, each of said mold sections carrying a heating unit, said heating units comprising annular shells of U-shaped cross section filled with plastic self-hardening material, heating elements embedded in said self-hardening material, and means for securing said shells with their open sides against the outer surfaces of said mold sections.

4. In an electrical cooking appliance, a mold section having a plurality of mold cavities therein, an annular shell of U-shaped cross section disposed with its open side against the outer surface of said mold section, said shell being filled with plastic self-hardening material, a heating element embedded within said self-hardening material and a plurality of draw bolts having threaded engagement with said mold section and carrying flanges overlying said annular shell to secure the same tightly against said mold section.

5. In a cooking appliance, upper and lower mold sections, said sections having flat contacting surfaces and each having a plurality of relatively large individual mold cavities, said cavities being spaced a relatively short distance apart, the cavities of one section being disposed oppositely to the corresponding cavities of another section when the sections are placed together, one of said mold sections having a narrow groove connecting a pair of said individual mold cavities to accommodate excess batter therefrom during cooking and to compensate for a deficiency of batter in one of said cavities and an excess of batter in another of said cavities.

6. In a cooking appliance, an open ended upright hollow base having an upper end of less diameter than the lower end thereof, upper and lower dish-shaped mold casings, said lower casing being seated in the open upper end of said base, a pair of co-operating mold section inset within said casing, a horizontal plate nested within said base and limited in upward movement by the restricted upper portion of said base, and a draw bolt anchored to said plate and having threaded engagement with a portion of said lower casing to secure said casing and mold section to said base.

In testimony whereof I affix my signature.
BENJAMIN SHAFFER.